Patented Nov. 2, 1943

2,333,280

UNITED STATES PATENT OFFICE 2,333,280

POLYVINYL HALIDE COMPOSITION

Harold Tucker, Cuyahoga Falls, Ohio, assignor to The B. F. Goodrich Company, New York, N. Y., a corporation of New York No Drawing. Application January 17, 1941, Serial No. 374,945

5 Claims. (Cl. 260—88)

This invention relates to polyvinyl halide compositions and pertains specifically to heat-stabilizers for plasticized compositions of these polymers.

It is well known that plasticized compositions of polymers in which the predominant constituent is a vinyl halide, such as alpha, beta, or gamma polyvinyl chloride, polyvinyl bromide, or copolymers of vinyl chloride with a minor proportion of a vinyl ester, for example vinyl acetate or vinyl cyanide, or of vinylidene chloride, are valuable materials as rubber substitutes in applications where resistance to acids, alkalies, oxidizing agents, oils, greases, etc. is important. However, these compositions all have a serious defect in that they tend to decompose, liberating hydrogen chloride and becoming dark-colored and brittle when heated to high temperatures. Ordinary bleaching agents such as hydrogen peroxide and sulfur dioxide or the sulfites are ineffective for removing the color from polymer compositions which have been discolored by heat-treatment. A solution of hydrogen peroxide will remove a part of the color, but not all of it. The sulfites are still less effective. It is apparent that this decolorization involves a fundamental change in the composition which cannot be rectified by the usual methods.

I have now discovered that this decomposition may be prevented, or its undesirable results eliminated, by means of compounds containing the hypochlorite group. The alkali metal, alkaline earth metal, and tertiary alkyl hypochlorites, including such compounds as sodium hypochlorite, potassium hypochlorite, calcium hypochlorite, magnesium hypochlorite, barium hypochlorite, tert.-butyl hypochlorite, tert.-amyl hypochlorite, etc. are most effective in producing this result.

These stabilizers may be incorporated directly into the plasticized polymer composition before heat treatment, either as a dispersion or solution in the plasticizer or separately after the plasticizer has been added to the polymer. Any of the usual methods of incorporation may be used, such as mixing on a hot roll mill, or in an internal mixer. When the stabilizers are used in this way it is desirable to have the inorganic hypochlorites in a finely-ground form in order to avoid lumps of the undispersed solid in the finished composition. The organic hypochlorites appear to be slightly less effective than the inorganic salts, but because of their greater miscibility with the polymer composition, larger amounts of these compounds may be used without producing an opacity in the product.

Although minute quantities of my new stabilizers are effective, greater amounts, up to the limit of solubility of the hypochlorite in the polymer composition, or even higher in the case of opaque stocks, may be used. In general, I prefer to use from 0.1% to 2.0% of the stabilizer by weight, based on the weight of the plasticized composition.

My new stabilizers may be used with any polymer in which the principal constituent is vinyl chloride, and with any of the ordinary plasticizers, such as tricresyl phosphate, dibutyl phthalate, butyl phthalyl butyl glycollate, dioctyl phthalate, etc.

The use of my new stabilizers is not limited to incorporation in the polymer composition before heat treatment for they may also be used to decolorize a stock which has been subjected to a high temperature without a stabilizer. For this purpose it is desirable to employ the stabilizers in the form of a solution in water or alcohol or some similar solvent. Hypochlorous acid itself may be used, either in the form of a solution of chlorine in water or as a mixture of chlorine gas and water vapor. The process may conveniently be carried out at room temperature, although slightly elevated temperatures are also satisfactory.

As a specific example in my invention, I have prepared a composition containing 70 parts by weight of gamma polyvinyl chloride and 30 parts of dioctyl phthalate; when molded 10 minutes at 320° F. this stock was dark brown in color; after molding 20 minutes at the same temperature it was amber. A similar stock containing 0.1% of calcium hypochlorite was light brown in color after 10 minutes, dark brown after 20 minutes. When 1.0% of calcium hypochlorite was used, the products were colored a very pale yellow and a pale yellow, respectively.

A similar composition, containing 56.5 parts by weight of gamma polyvinyl chloride, 42.5 parts of dioctyl phthalate, and 1.0 part of tertiary butyl hypochlorite, when molded 20 minutes at 297° F. was a very pale yellow color, whereas a similar stock without stabilizer was dark brown in color after the same treatment.

Another stock, composed of 62.5 parts by weight of gamma polyvinyl chloride and 37.5 parts of butyl phthalyl butyl glycollate, which had become reddish brown color after heat treatment was completely bleached by immersion in chlorine water for 16 to 20 hours at room temperature.

Other substances, such as pigments, fillers, softeners, other stabilizers, etc. may also be present in the composition. Compositions containing my stabilizers may be processed in the usual manner that is, by calendering, extruding, molding, applying in the form of a solution in a suitable solvent, etc.

Although I have herein disclosed specific embodiments of my invention, I do not intend to limit myself solely thereto, but only to the spirit and scope of the following claims.

I claim:

1. A composition comprising a polymer made from a monomeric material consisting substantially of vinyl chloride, a plasticizer, and a member of the class consisting of alkali metal hypochlorites, alkaline earth metal hypochlorites, and tertiary alkyl hypochlorites.

2. A composition comprising gamma polyvinyl chloride, a plasticizer, and a member of the class consisting of alkali metal hypochlorites, alkaline earth metal hypochlorites, and tertiary alkyl hypochlorites.

3. A composition comprising gamma polyvinyl chloride, a plasticizer, and calcium hypochlorite.

4. A composition comprising gamma polyvinyl chloride, a plasticizer, and tertiary butyl hypochlorite.

5. A composition comprising gamma polyvinyl chloride, a plasticizer, and sodium hypochlorite.

HAROLD TUCKER.